(12) United States Patent
Jones et al.

(10) Patent No.: US 11,941,016 B2
(45) Date of Patent: *Mar. 26, 2024

(54) USING SPECIFIED PERFORMANCE ATTRIBUTES TO CONFIGURE MACHINE LEARNING PIPEPLINE STAGES FOR AN ETL JOB

(71) Applicant: Amazon Technologies, Inc., Seattle, WA (US)

(72) Inventors: Timothy Jones, Brier, WA (US); Andrew Borthwick, Kirkland, WA (US); Sergei Dobroshinsky, Issaquah, WA (US); Shehzad Qureshi, North Bend, WA (US); Stephen Michael Ash, Seattle, WA (US); Pedrito Uriah Maynard-Zhang, Issaquah, WA (US); Chethan Kommaranahalli Rudramuni, Seattle, WA (US); Abhishek Sharma, Seattle, WA (US); Juliana Saussy, Seattle, WA (US); Adam Lawrence Joseph Heinermann, Vancouver (CA); Alaykumar Navinchandra Desai, Santa Clara, CA (US); Mehul A. Shah, Saratoga, CA (US); Mehul Y. Shah, Redmond, WA (US); Anurag Windlass Gupta, Atherton, WA (US); Prajakta Datta Damle, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 57 days.

This patent is subject to a terminal disclaimer.

(21) Appl. No.: 17/687,492

(22) Filed: Mar. 4, 2022

(65) Prior Publication Data
US 2022/0261413 A1     Aug. 18, 2022

Related U.S. Application Data

(63) Continuation of application No. 16/199,115, filed on Nov. 23, 2018, now Pat. No. 11,269,911.

(51) Int. Cl.
*G06F 16/25* (2019.01)
*G06F 9/54* (2006.01)
*G06N 20/00* (2019.01)

(52) U.S. Cl.
CPC ............ *G06F 16/254* (2019.01); *G06F 9/543* (2013.01); *G06N 20/00* (2019.01)

(58) Field of Classification Search
CPC ........ G06F 9/542; G06F 16/254; G06F 17/30; G06F 9/54; G06N 20/00
(Continued)

(56) References Cited

U.S. PATENT DOCUMENTS 8,417,715 B1 *  4/2013  Bruckhaus ............. G06Q 10/04
                                                            705/26.1
8,458,691 B2    6/2013  Fellenstein et al.
(Continued)

OTHER PUBLICATIONS

Anonymous, "File based job trigger for deploying talend open studio jobs—Talend Community forum", Retrieved from URL: https//www.talendforge.org/forum/viewtopic.php?id=45580, retrieved on Jan. 10, 2018, pp. 1-3.
(Continued)

*Primary Examiner* — Hicham Skhoun
(74) *Attorney, Agent, or Firm* — S. Scott Foster; Kowert, Hood, Munyon, Rankin & Goetzel, P.C.

(57) ABSTRACT

Specified performance attributes may be used to configure machine learning transformations for ETL jobs. Performance attributes for a machine learning pipeline that applies a model to as part of a transformation for an ETL job may be used to configure a parameter in a stage of the machine (Continued)

learning pipeline. The configured stage may then be used when training the model. The trained machine learning pipeline may then be applied as part of a transformation operation included in an ETL job performed by the ETL system.

20 Claims, 13 Drawing Sheets

(58) Field of Classification Search
USPC .......................................................... 707/602
See application file for complete search history.

(56) References Cited

U.S. PATENT DOCUMENTS

| | | | |
|---|---|---|---|
| 9,910,903 | B1 | 3/2018 | Jilani et al. |
| 10,354,187 | B2 | 7/2019 | Kasravi et al. |
| 10,528,671 | B1 | 1/2020 | Robertson et al. |
| 10,713,587 | B2 | 7/2020 | Rozier |
| 11,269,911 | B1 | 3/2022 | Jones et al. |
| 11,277,494 | B1* | 3/2022 | McPherson ............. H04L 67/01 |
| 2008/0147673 | A1 | 6/2008 | Candea et al. |
| 2009/0177671 | A1 | 7/2009 | Pellegrini et al. |
| 2009/0192979 | A1 | 7/2009 | Lunde |
| 2010/0274750 | A1 | 10/2010 | Oltean et al. |
| 2013/0191404 | A1 | 7/2013 | Holmes et al. |
| 2013/0332194 | A1* | 12/2013 | D'Auria ................. G16H 10/60 705/3 |
| 2014/0074760 | A1 | 3/2014 | Boldyrev et al. |
| 2014/0372346 | A1* | 12/2014 | Phillipps ................ G06N 20/00 706/12 |
| 2015/0100542 | A1 | 4/2015 | Li et al. |
| 2015/0113009 | A1 | 4/2015 | Zhou et al. |
| 2015/0256475 | A1* | 9/2015 | Suman .................... H04L 47/83 709/226 |
| 2015/0286701 | A1 | 10/2015 | Wideman |
| 2015/0286969 | A1* | 10/2015 | Warner .............. G06Q 10/0633 705/7.27 |
| 2015/0347541 | A1 | 12/2015 | Holmes et al. |
| 2016/0005171 | A1 | 1/2016 | Watanabe et al. |
| 2016/0227087 | A1 | 8/2016 | Hirakata et al. |
| 2017/0039198 | A1 | 2/2017 | Ramamurthy et al. |
| 2017/0063906 | A1* | 3/2017 | Muddu ................. G06N 20/20 |
| 2017/0091673 | A1 | 3/2017 | Gupta et al. |
| 2017/0109667 | A1* | 4/2017 | Marcu ................... G06F 9/4843 |
| 2017/0116295 | A1 | 4/2017 | Wan et al. |
| 2017/0132525 | A1* | 5/2017 | Rozier .................. G06Q 10/10 |
| 2018/0203922 | A1 | 7/2018 | Erpenbach et al. |
| 2018/0365305 | A1 | 12/2018 | Li et al. |
| 2019/0095801 | A1* | 3/2019 | Saillet ...................... G06N 5/04 |
| 2019/0228261 | A1* | 7/2019 | Chan ..................... G06F 16/221 |
| 2019/0228621 | A1 | 7/2019 | Bostick et al. |
| 2019/0272471 | A1* | 9/2019 | Jain ........................... G06F 8/60 |
| 2019/0287032 | A1 | 9/2019 | Seabolt et al. |
| 2019/0304036 | A1* | 10/2019 | Nassar .................... H04L 51/52 |
| 2020/0004863 | A1* | 1/2020 | Kumar ..................... G06N 7/01 |
| 2020/0027010 | A1 | 1/2020 | Lorenc et al. |
| 2020/0034842 | A1* | 1/2020 | Ponniah ................. G06Q 40/03 |
| 2020/0134379 | A1* | 4/2020 | Gaidon ............... G06F 18/2155 |
| 2020/0294642 | A1* | 9/2020 | Bostic .................... G16H 50/20 |
| 2022/0366494 | A1* | 11/2022 | Cella ......................... H04L 9/50 |

OTHER PUBLICATIONS

Oracle: "Triggers-Oracle Database Concepts", Retrieved from URL: https://Web.archive.org/web/20150918220843/ https://docs.oracle.com/cd/B19306_01/server.102/b14220/triggers.htm, retrieved on Jan. 11, 2018, pp. 1-1.
Bratko, A. et al., "Exploiting Structural Information for semi-structured document categorization", Information Processing & Management, Dated May 1, 2006, vol. 42, No. 3, pp. 679-694.
Juan Trujillo et al., "A UML Based Approach for Modeling ETL Processes in data warehouses", In: Network and parallel computing, dated Oct. 16, 2003, pp. 1-14.
Anonymous, "Start informatica job when a row is updated", retrieved from URL: https://network.informatica.com/thread/13920. on Jan. 10, 2018. pp. 1-5.

* cited by examiner

USING SPECIFIED PERFORMANCE ATTRIBUTES TO CONFIGURE MACHINE LEARNING PIPEPLINE STAGES FOR AN ETL JOB

This application is a continuation of U.S. patent application Ser. No. 16/199,115, filed Nov. 23, 2018, which are hereby incorporated by reference herein in its entirety.

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. The increasing amount of data that organizations must store and manage often correspondingly increases both the size and complexity of data storage and management technologies, like database systems, which in turn escalate the cost of maintaining the information. New technologies seek to reduce both the complexity and storage requirements of maintaining data by extracting, transforming, and loading data into different data storage or analysis systems. The advent of machine learning techniques has introduced new possibilities for transforming data which can be incorporated to improve the capability of systems to perform these Extract Transform Load (ETL) jobs.

Figure 1:
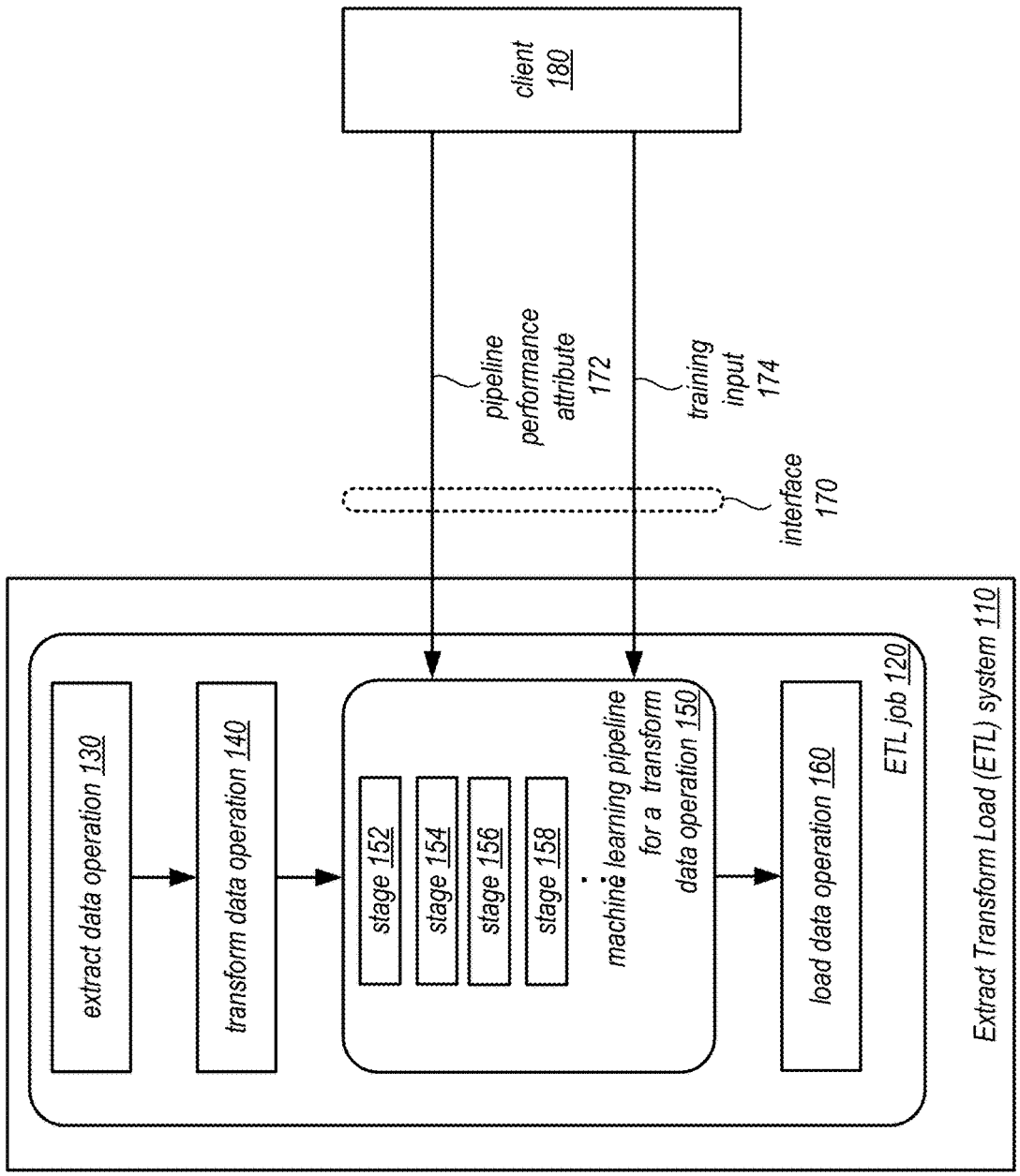
FIG. 1 illustrates a logical block diagram of using specified performance attributes to configure machine learning pipeline stages for an Extract Transform Load (ETL) job, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of using specified performance attributes to configure machine learning pipeline stages for an ETL job are described herein. ETL processing provides data administrators, stake holders, producers, or consumers with the ability to take advantage of different data formats, storage systems, or storage locations by facilitating the movement of data across different data stores and data schemas or formats. For example, data producers that collect usage and other analytics for web site interactions (e.g., visitor clicks and other actions), may generate stored analytics data in large log files or other semi-structured data formats. However, in order to perform various analytical operations or queries over the analytics data, an ETL job may be performed to extract desired data, transformed the desired data into a format usable by an analytics engine, like a database system, and load the extracted data into the appropriate storage system in the appropriate data schema and format.

ETL jobs may apply various and multiple transformation operations to extracted data. Some transformation operations, such as data splits, combinations, conversions from one data type to another may be accomplished using rules-based techniques or implementations. Some types of transformations could instead rely upon machine learning models implemented in machine learning pipeline in order to perform a transformation. One such example transformation is record linking where similar items from the same data set (or different data sets) are identified. Identifying similar items can be used to match items and link records, among other uses for similar item detection. In order to implement an effective machine learning-based transformation, a machine learning model and various stages of a machine learning pipeline may need to be trained to recognize what similar items are like, as different applications may utilize different ideas of similarity (e.g., from items with exactly matching data to items that differ in some data values but together describe a same item).

Machine learning model training is a challenging subject matter for many users. The various combinations of stages and parameters that control the machine learning pipeline stages may not present a clear understanding between the relationship of different stage parameters and performance of the machine learning pipeline. In various embodiments, performance attributes may be specified by a user and then used to configure stage parameters to achieve the desired performance of a machine learning pipeline. In this way, custom machine learning pipelines that apply a machine learning model to perform a transformation operation in an ETL job can be easily trained and deployed, without requiring a user to separately generate and train a machine learning model for use in an ETL pipeline and implement ETL code to incorporate the machine learning model and pipeline machine learning stage into an ETL job. Moreover, in various embodiments, additional training or adjustments to stage parameters may be quickly performed and updated so that any ETL job that utilizes the model and pipeline (and more than one ETL job could use the same model and pipeline in some embodiments).

FIG. 1 illustrates a logical block diagram of using specified performance attributes to configure machine learning pipeline stages for an Extract Transform Load (ETL) job, according to some embodiments. ETL system 110 may be a standalone ETL system or implemented as part of an ETL service, such as discussed below with regard to FIGS. 2-7. ETL system may perform ETL jobs, such as ETL job 120, to access one or more data stores to retrieve data from one or more sources, perform one or more transformations on the retrieved data, and then store the data in storage location (e.g., different than the location from which the data was taken), in some embodiments. ETL system 110 may implement one or multiple computing systems, such as computing system 1000 discussed below with regard to FIG. 10.

ETL system 110 may perform an ETL job 110 which may identify the operations to perform the ETL job 110. For example, extract data operation 130 may identify where source data for the ETL job is to be found (e.g., network address, storage location, file handle, object identifier, etc.), what format the source data is in (e.g., file format, encryption scheme, compression scheme, etc.), and how to access the data (e.g., identity tokens, credentials, passwords, etc.). Transform data operations, such as transform data operation 140, may perform various types of transformations, such as dropping or filtering columns or fields, joining values, mapping values, renaming fields, splitting fields, unboxing fields, splitting rows, and so on.

Some transformations may use a machine learning pipeline that matches, links, or otherwise operates on items identified to be similar by the application of a machine learning model trained to recognize similar items in the pipeline, in some embodiments. Other examples of machine learning pipelines for transformation operations in an ETL job may include record fusion pipelines for merging data into a record which contains the best possible integration, missing value imputation pipe lines for predicting missing values (e.g., in fields of a table), data lake data similarity search pipe lines for identifying related datasets, semantic type or taxonomy classification pipelines for columns for performing data scrubbing (e.g., flagging personally identifiable information for removal), and auto regression/auto classification pipelines to predict numbers/categories/etc. based on existing database data, and anomaly detection pipelines for flagging rows or entries that are not like the others.

Figure 5:
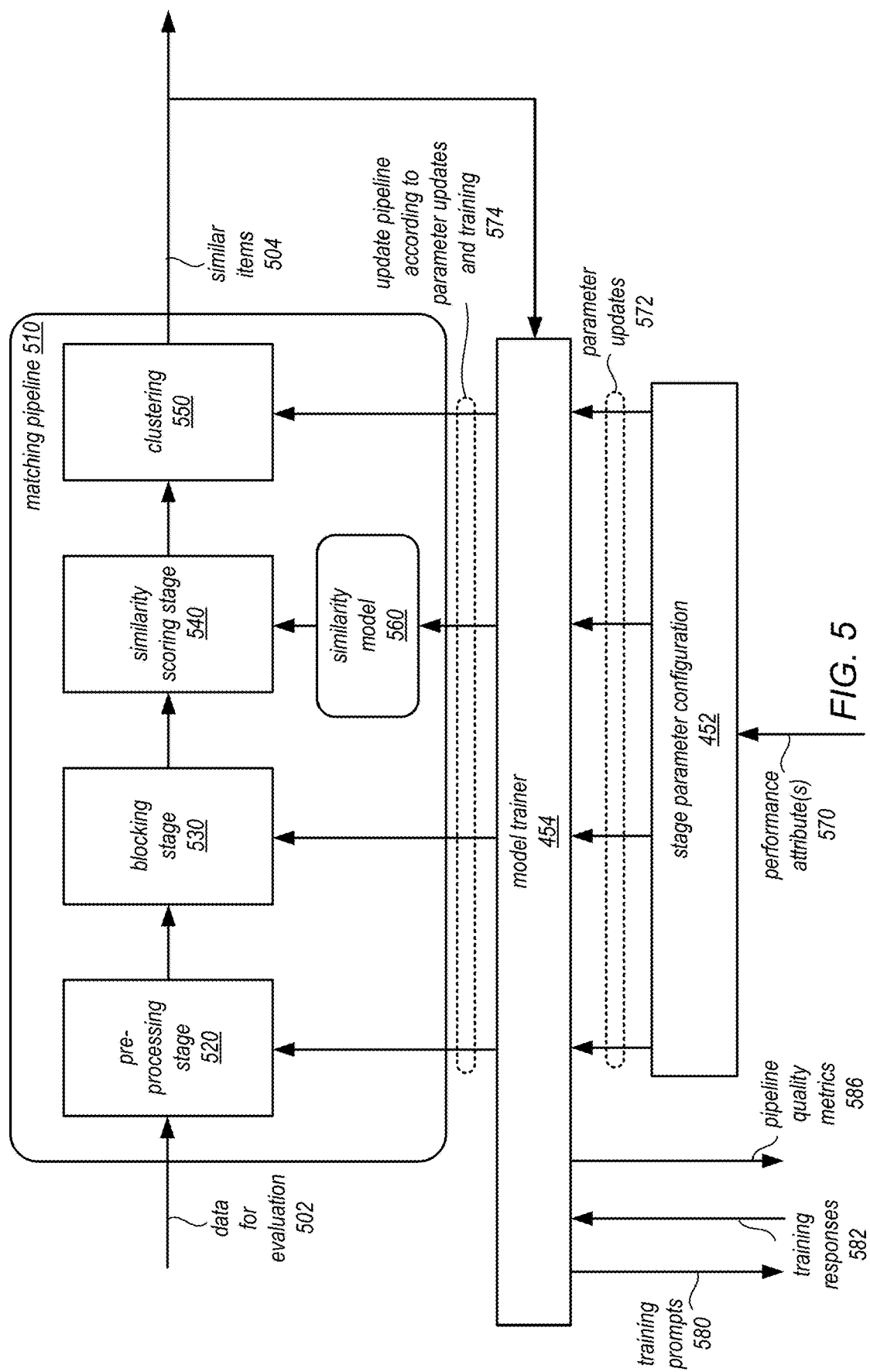
FIG. 5 is a logical block diagram illustrating interactions to configure parameters for stages of a machine learning pipeline according to performance attributes, according to some embodiments.

A machine learning pipeline, like machine learning pipeline 150 may implement multiple data processing stages, such as stages 152, 154, 156, and 158, to apply various techniques, like pre-processing, item selection, analysis, result refinement, in order to identify similar items, as discussed in more detail below with regard to FIG. 5. Each stage may have one or more parameters which can modify the performance of the stage and in turn modify the performance of the machine learning pipeline 150 as a whole. Instead of expecting ETL users to be able to manipulate non-intuitive stage parameters in the machine learning pipeline, ETL system 110 may implement interface 170 (e.g., an Application Programming Interface (API), graphical user interface (GUI), and/or command line interface) to allow a client 180 to specify pipeline performance attributes 172 via the interface, which ETL system can then interpret and correspondingly adjust one or more stage parameters. For example, depending on the clustering technique for identifying which pairs, groups, or sets refer to a similar item, the parameters for increasing or decreasing the sensitivity of the clustering stage may change or be represented differently. Moreover, because pipeline performance attributes 172 can be more uniformly applicable to different machine learning pipelines (e.g., different matching pipelines) with different stages, client applications can programmatically specify the desired performance of a machine learning pipeline independent of the underlying pipeline's implementation.

In some embodiments, ETL system 110 may also receive input for training, as indicated at 174. For example, if machine learning pipeline for a transform data operation 150 were a matching pipeline for items, training input may be an indication of similar items, as discussed below with regard to FIGS. 6B, 6C, and 9. Because different ETL jobs working on different ETL data sets may have different meanings or uses for training input in different machine learning pipelines, machine learning pipeline 150 may be trained for different ETL jobs according to the received training input 174. In this way, custom machine learning pipelines and models can be incorporated into an ETL job 120 by ETL system 110. The model and parameters may be stored and reused in other ETL jobs and/or updated, as discussed below with regard to FIGS. 4 and 6B.

ETL job 120 may also include a load data operation 160, which may indicate where source data for the ETL job is to be stored (e.g., network address, storage location, file handle, object identifier, etc.), and how to access the storage location (e.g., identity tokens, credentials, passwords, etc.).

Please note that the previous description of using specified performance attributes to configure machine learning pipeline stages for an ETL job is a logical illustration and thus is not to be construed as limiting as to the architecture for implementing a client or ETL system.

This specification begins with a general description of a provider network that implements an extract, transform, load (ETL) service that identifies, transforms, and moves data stored in the provider network or in external data stores. Then various examples of the ETL service including different components/modules, or arrangements of components/module that may be employed as part of implementing the ETL service are discussed. A number of different methods and techniques to implement using specified performance attributes to configure machine learning pipeline stages for an ETL job are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
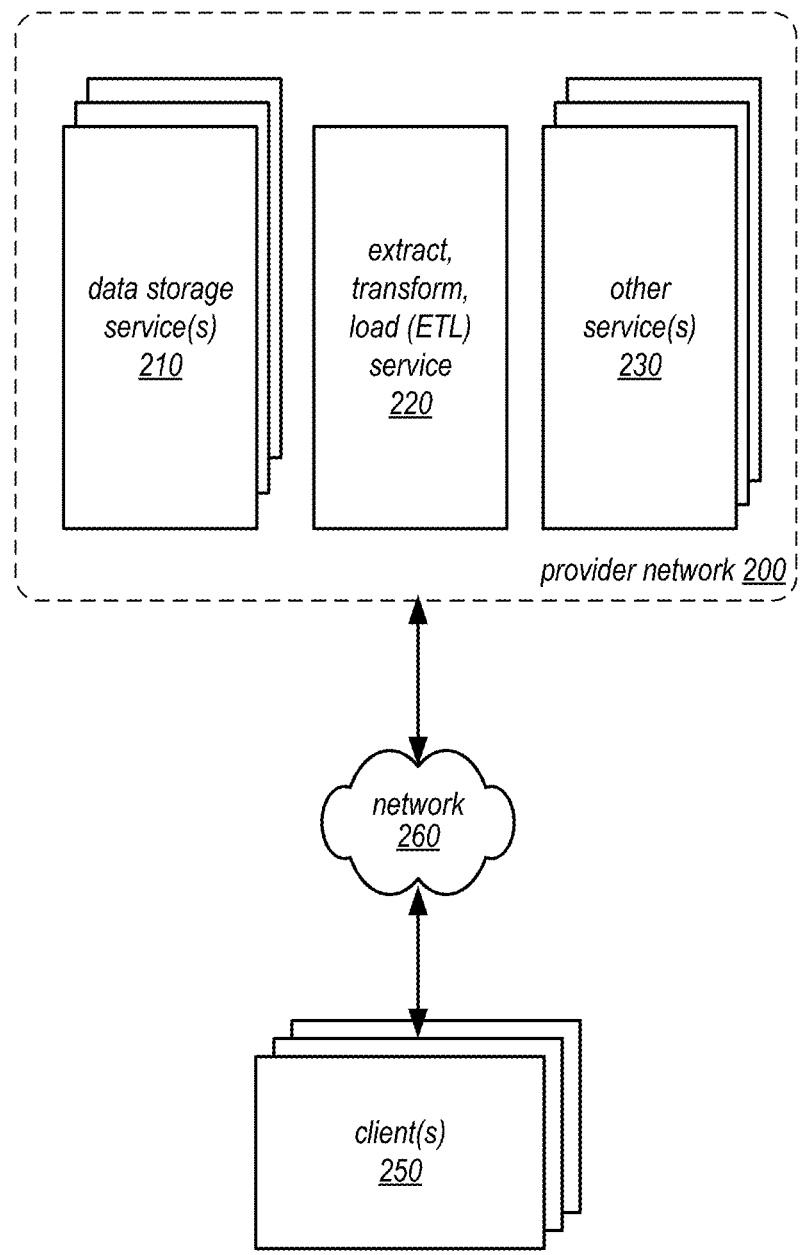
FIG. 2 is a logical block diagram illustrating a provider network offering different services including an extract, transform, load (ETL) service, according to some embodiments.

FIG. 2 is a logical block diagram illustrating a provider network offering different services including an extract, transform, load (ETL) service, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200. In some embodiments, provider network 200 may implement various computing resources or services, such as a data storage service(s) 210 (e.g., object storage services, block-based storage services, or data warehouse storage services), ETL service 220, as well as other service(s) 230, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Data storage service(s) 210 may implement different types of data stores for storing, accessing, and managing data on behalf of clients 250 as a network-based service that enables clients 250 to operate a data storage system in a cloud or network computing environment. For example, data storage service(s) 210 may include various types of database storage services (both relational and non-relational) or data warehouses for storing, querying, and updating data. Such services may be enterprise-class database systems that are scalable and extensible. Queries may be directed to a database or data warehouse in data storage service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 210 may also include various kinds of object or file data stores for putting, updating, and getting data objects or files, which may include data files of unknown file type. Such data storage service(s) 210 may be accessed via programmatic interfaces (e.g., APIs) or graphical user interfaces. Data storage service(s) 210 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In some embodiments, ETL service 220 may create and dynamically update a catalog of data stored on behalf of clients in provider network 200 across the various data storage services 210, as discussed in detail below with regard to FIG. 3. For example, a database stored in a non-relational database format may be identified along with container storing objects in an object-based data store as both being stored on behalf of a same customer of provider network 200. ETL service 220 may also perform ETL jobs that extract, transform, and load from one or more of the various data storage service(s) 210 to another location. For example, ETL service 220 may provide clients with the resources to create, maintain, and orchestrate data loading jobs that take one or more data sets, perform various transformation operations, and store the transformed data for further processing (e.g., by one or more of data processing service(s)). ETL service 220 may access a data catalog generated by ETL service 220 in order to perform an ETL operation (e.g., a job to convert a data object from one file type into one or more other data objects of a different file type).

Other service(s) 230 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage services 210. Various other distributed processing architectures and techniques may be implemented by data processing services (e.g., grid computing, sharding, distributed hashing, etc.). Note that in some embodiments, data processing operations may be implemented as part of data storage service(s) 210 (e.g., query engines processing requests for specified data). Data processing service(s) may be clients of ETL service 220 in order to invoke the execution of an ETL job to make data available for processing in a different location or data format for performing various processing operations with respect to data sets stored in data storage service(s) 210.

Generally speaking, clients 250 may encompass any type of client configurable to submit network-based requests to provider network 200 via network 260, including requests for storage services (e.g., a request to create, read, write, obtain, or modify data in data storage service(s) 210, a request to generate an ETL job at ETL service 220, etc.). For example, a given client 250 may include a suitable version of a web browser, or may include a plug-in module or other type of code module configured to execute as an extension to or within an execution environment provided by a web browser. Alternatively, a client 250 may encompass an application such as a database application (or user interface thereof), a media application, an office application or any other application that may make use of storage resources in data storage service(s) 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200. In some embodiments, client 250 may be configured to generate network-based services requests according to a Representational State Transfer (REST)-style network-based services architecture, a document- or message-based network-based services architecture, or another suitable network-based services architecture. Although clients 250 are illustrated as external to provider network 200, in some embodiments clients of different services, like ETL service 220, can be implemented within provider network 200 (e.g., implemented on a resource of other service(s) 230, such as virtual compute instance).

In some embodiments, a client 250 may be configured to provide access to provider network 200 to other applications in a manner that is transparent to those applications. For example, client 250 may be configured to integrate with an operating system or file system to provide storage on one of data storage service(s) 210 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 210 may be coordinated by client 250 and the operating system or file system on behalf of applications executing within the operating system environment.

Clients 250 may convey network-based services requests (e.g., access requests directed to data in data storage service(s) 210, operations, tasks, or jobs, being performed as part of other service(s) 230, or to interact with ETL service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
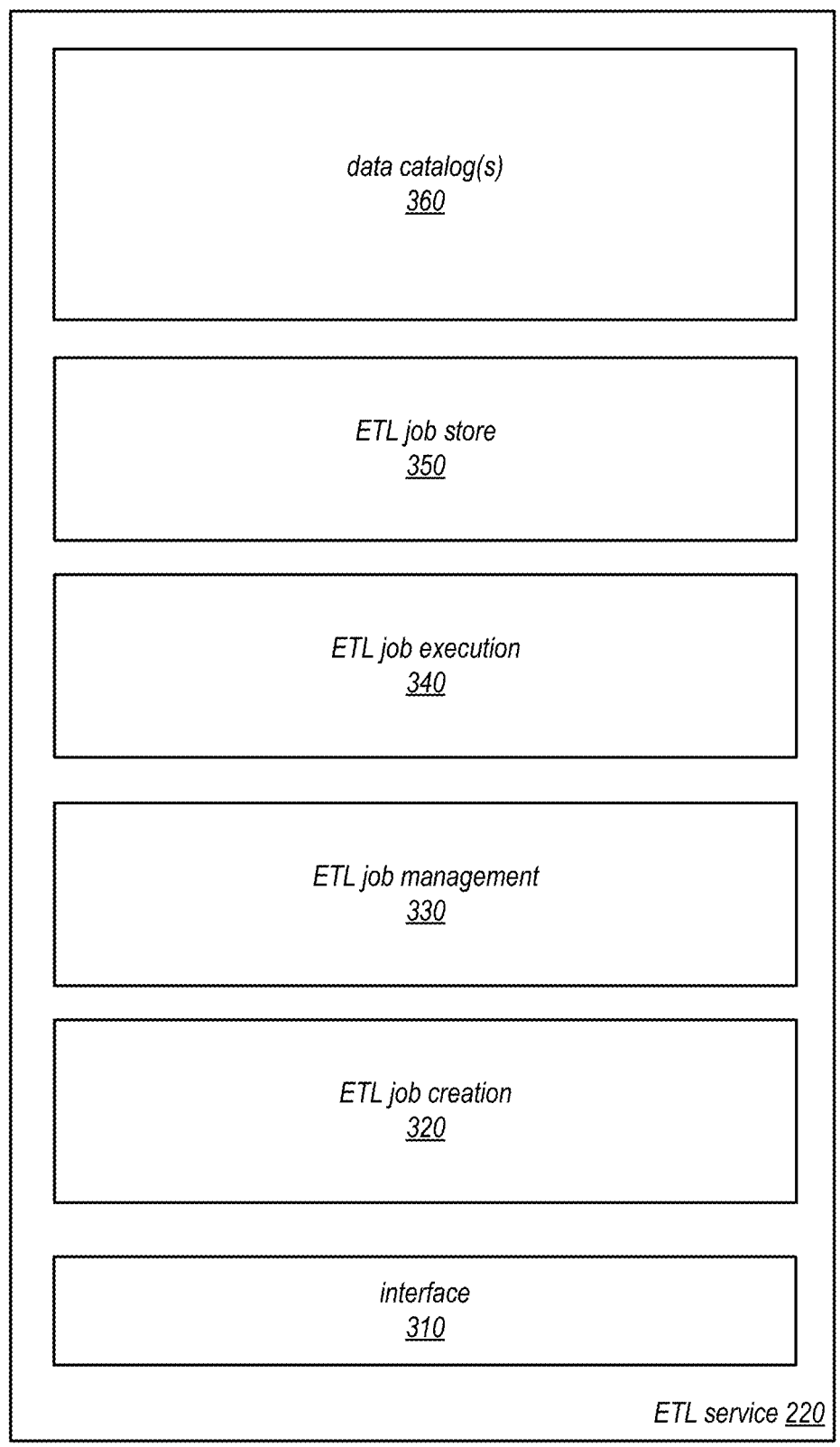
FIG. 3 is a logical block diagram illustrating an ETL service that include transformation operations using machine learning pipelines, according to some embodiments.

FIG. 3 is a logical block diagram illustrating an ETL service that include transformation operations using machine learning pipelines, according to some embodiments. ETL service 220 may provide access to data catalogs 360 and ETL jobs (for creation, management, and execution) via interface 310, which may be a programmatic interface (e.g., Application Programming Interface (API)), command line interface, and/or graphical user interface, in various embodiments.

ETL Service 220 may implement ETL job creation 320 to handle the creation of ETL jobs through manual job creation (e.g., creating, edit, or uploading ETL code or creating or editing graphs of ETL jobs) or through automated job creation. ETL job creation 320 may handle requests for automated ETL job creation and manual ETL job creation. For example, ETL job creation 320 may receive job generation request which may specify the data object and target data format for the ETL job. Other job information, such as access credentials, triggering events, or any other information to execute the ETL job may be included as part of the creation request or as part of a trigger event registration request. ETL job creation 320 may automatically generate ETL code to perform an ETL job by determining the source data format of the data object and the target data format of the data object. For example, in one embodiment, the source and target data formats from data catalog 360. In another embodiment, data format identification may perform data format recognition techniques, or access other data stores (e.g., such as a data catalog stored in relational database) to retrieve the data format information. ETL job creation 320 may then compare the source data format and target data format or schema to select transformations to apply to the source data object to achieve the target data format. ETL job creation 320 may then generate code for selected transformations and construct the source code for executing the selected transformations. The code for the ETL job may be stored in ETL job store 350 for subsequent execution.

ETL job creation 320 may also implement manual creation of ETL jobs. For example, transformation operations may be manually selected, combined, or assembled via graphical user interface to define a workflow of transformations to apply. Code corresponding to the workflow may be generated (or supplied by a user), edited, and stored for subsequent execution as part of ETL job store 350.

ETL service 220 may implement ETL job management 330 to provide clients with the ability to manage, edit, delete, or otherwise change ETL jobs. Trigger events, may also be defined for ETL jobs (as discussed below with regard to FIG. 6). ETL job management 330 may monitor for trigger events and request execution of ETL jobs.

ETL service 220 may implement ETL job execution 340 to provide an execution platform ETL jobs. In some embodiments, ETL job execution 340 may provide a serverless architecture (from the perspective of clients) so that the appropriate number of resources are provisioned (e.g., virtual compute instances from a virtual compute service executing the ETL job code) in order to satisfy performance requirements, objectives, or goals provided by a client or by ETL service 220. ETL job execution 340 may execute jobs, in some embodiments, automatically without any user editing changes to the automatically generated ETL code from ETL job creation 320. In some embodiments, ETL job execution 340 may execute automatically generated ETL jobs that were modified. ETL job execution 340 may execute jobs in response to detected triggering events for ETL jobs (which may be detected by ETL job management or another system or service monitoring for triggering event conditions), as discussed below with regard to FIG. 7.

ETL service 220 may maintain data catalogs 360 that describe data sets (stored in provider network 200 or in external storage locations). ETL service 220 may identify unknown data objects, identify a data format for the unknown data objects and store the data format in a data catalog for the unknown data objects. ETL service 220 allow for catalog users, owners, or other stakeholders, to modify or otherwise manage data catalogs. For instance, ETL service 220 may process and execute access requests directed to data catalog(s) 360 (e.g., requests to combine, delete, or split tables of metadata in the catalog or edit the metadata determined for a data catalog). ETL service 220 may implement access or control policies for data catalogs (e.g., to limit access to a data catalog to authorized users). ETL service 220 may implement data retention or life cycle policies to determine how long data catalogs (or older versions of data catalogs) are maintained. ETL service 220 may handle the provisioning of storage resources in data for creating new data catalogs. ETL service 220 may also perform load balancing, heat management, failure recovery, and other resource management techniques (e.g., implement durability requirements) to ensure the availability of data catalogs for clients.

Storage for data catalog(s) 360 may be implemented by one or more storage nodes, services, or computing devices (e.g., system 1000 discussed below with regard to FIG. 10) to provide persistent storage for data catalogs generated by data catalog service 200. Such storage nodes (or other storage components of storage for data catalog(s) 360) may implement various query processing engines or other request handling components to provide access to data catalogs according to requests received via interface 310. For example, data catalog storage may be implemented as a non-relational database, in one embodiment, that stores file types and other metadata for data objects in table. In some embodiments, collections of metadata for various data objects stored across different storage service(s) 210 on behalf a single user account may be stored together in a single catalog of metadata that may be made accessible to clients.

Figure 4:
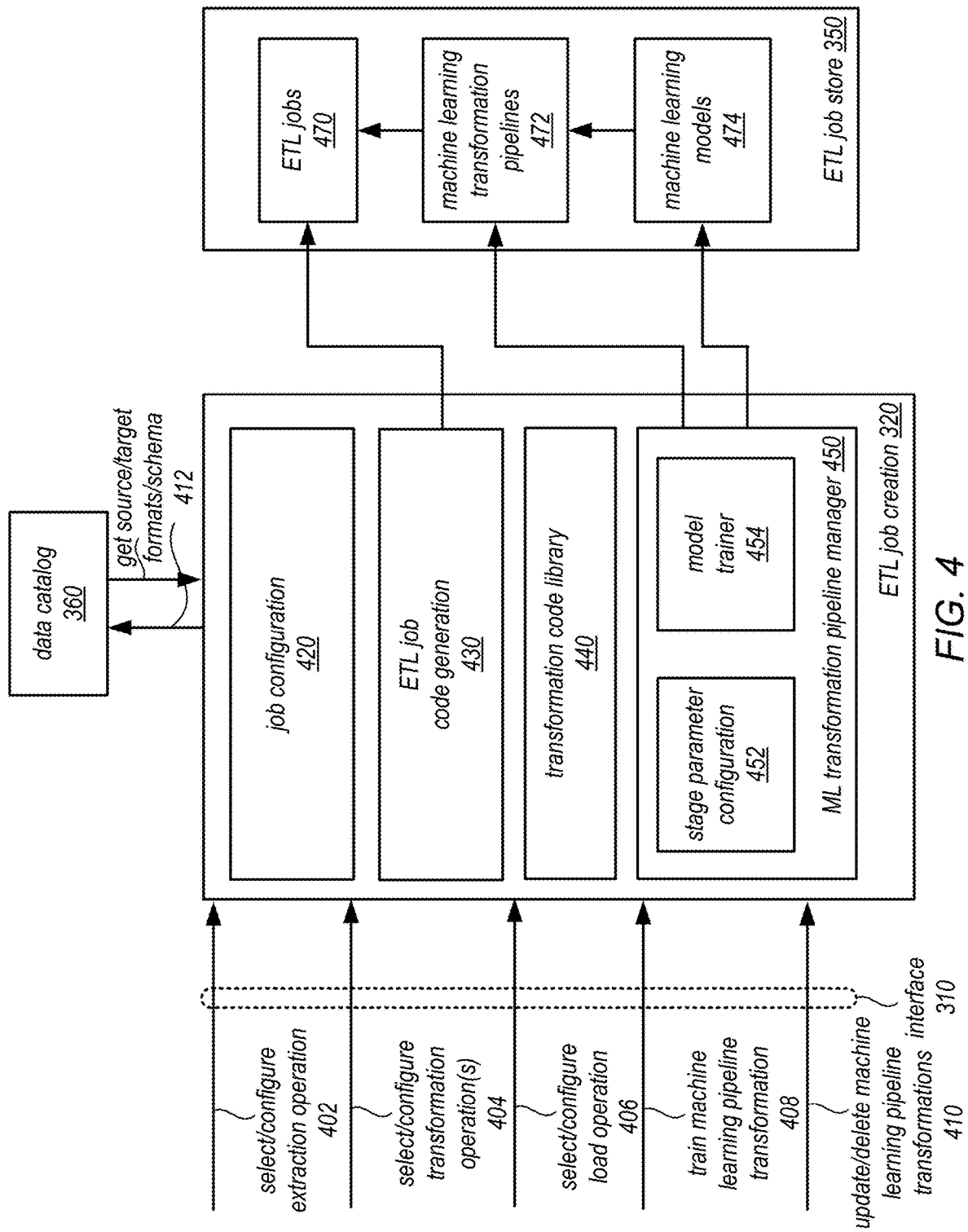
FIG. 4 is a logical block diagram illustrating ETL job creation, according to some embodiments.

FIG. 4 is a logical block diagram illustrating ETL job creation, according to some embodiments. ETL job creation 320 may handle various requests to create and configure ETL jobs performed by ETL service 220. For example, ETL job creation 320 may implement job configuration feature 420 to handle requests to create and configure ETL jobs. For example, job configuration 420 may implement a series of interactions via a GUI to guide a user through the configuration of an ETL job. For instance, job configuration 420 may solicit input that selects and configures an extraction operation 402 via interface 310. The selection and configuration of an extraction operation input 402 may include where source data for the ETL job is to be found (e.g., network address, storage location, file handle, object identifier, etc.), what format the source data is in (e.g., file format, encryption scheme, compression scheme, etc.), and how to access the data (e.g., identity tokens, credentials, passwords, etc.). In some embodiments, selection and configuration of an extraction operation input 402 may specify an ETL job platform (e.g., Apache Spark or other distributed processing platform) and/or hardware (e.g., X processing capacity, Y memory, and Z network bandwidth).

ETL job configuration 420 may handle requests or solicited input to select and configuration transformation operations 404. For instance, job configuration 420 may implement an interactive interface allowing users to visually connect transformation jobs of specified types to other transformation jobs and an extraction operation and load operation. Requests or solicited input to select and configure transformation operations 404 may include what transformation operation (e.g., machine learning pipeline, data mapping, data filtering, data splitting, data joining, storage format conversion, etc.), various operational parameters for performing the transformation operation (e.g., which columns to join into a single column), among other information for performing a transform data operation. As discussed in detail below with regard to FIGS. 5-6C, various requests or input to configure a machine learning pipeline may be received.

ETL job configuration 420 may handle requests or solicited input to select and configure load operations, in some embodiments. For example, requests or solicited input to select and configure load operations may indicate where source data for the ETL job is to be stored (e.g., network address, storage location, file handle, object identifier, etc.), and how to access the storage location (e.g., identity tokens, credentials, passwords, etc.).

ETL job code generation 430 may perform automated or manually specified via interface 310 ETL code generation for an ETL job. For example, ETL job code generation may get code for specific transformations (or workflows of multiple transformations) from transformation code library 440 and construct the source code for executing the transformations 456. For example, a summation transformation to add the values from multiple data fields into a single value may be generated according to a summation function or operation defined or specified by code library 440 or the code to implement machine learning transformation pipeline stages. In some embodiments operation configuration/selection requests may indicate a specified type of output source code (e.g., Python, Java, C#, etc.). ETL job code generation 430 may store encoded ETL jobs 470 in ETL job store 350.

ETL job creation 320 may implement machine learning (ML) transformation pipeline manager 450, in some embodiments. ML transformation pipeline manager 450 may provide access to stored machine learning transformation pipelines 472 and machine learning models 474 (e.g., via a search or list function that displays created, trained, and/or deployed machine learning transformation pipelines 472). ML transformation pipeline manager 450 may handle requests to update or train machine learning pipeline transformations 408, as discussed in detail below with regard to FIGS. 5-6C and requests to update or delete machine learning transformation pipelines 410, in some embodiments.

ML transformation pipeline manager 450 may implement stage parameter configuration 452 and model trainer 454 to configure the stages and models of a machine learning transformation pipeline respectively. FIG. 5 is a logical block diagram illustrating interactions to configure parameters for stages of a machine learning pipeline according to performance attributes, according to some embodiments. An example machine learning pipeline, matching pipeline 510, may include different stages, such as pre-processing stage 520, blocking stage 530, similarity scoring stage 540 (which may utilize similarity model 560), and clustering stage 550.

Each stage may be implemented in various ways and according to different parameters. For example, pre-processing stage 520 may perform various operations to normalize data (e.g., reformat or reorder values), filter data (e.g., to only operate on select columns), among other operations. Parameters for pre-processing stage 520 may, for example, include feature selection and number of columns to process, in some embodiments.

Blocking stage 530 may identify which sets of rows, entries, records, or other items in a data source should be grouped for similarity analysis. For example, blocking stage 530 may identify possibly matching pairs of records as sets of possibly similar records without having to perform pairwise matching for all possible combinations of records (e.g., O(number of records)2), in some embodiments. Parameters for blocking stage 530 may, for example, include a parameter indicating the size of records to be included within possible matching item sets.

Similarity scoring stage 540 may apply similarity model 560, which may be a trained comparison of items that produces an indication of similarity between items (e.g., a model, which may be a function trained using regression similarity learning or classification similarity learning, and producing a similarity score value for input items). Parameters for similarity scoring stage 540 may, for example, be hyper-parameters that affect the training of similarity model 560, in some embodiments.

Clustering scoring stage 550 may analyze the similarity scores produced for items to identify a cluster of items that can be identified as similar, in some embodiments. For example, a graph-based representation of the items, with edges weighted according to similarity score values may be generated and partitioned in order to identify those items in a partition as similar. Parameters for clustering stage 550 may, for example, include a transitive closure parameter or other parameter that specifies a threshold for including an item in a cluster of similar items.

Stage parameter configuration 452 may receive performance attributes 570 as part of a request to create, configure, or update an ETL job at ETL job service 220. Stage parameter configuration 452 may map the various specified performance attributes to corresponding parameter values at one (or more) of matching pipeline stages. For example, an performance parameter regarding a number of matches or certainty of matches may corresponding change a performance parameter to raise a threshold for inclusion in clustering stage 550 (e.g., for performance attributes with fewer matches and more certainty) and lower a threshold for inclusion in clustering stage 550 (e.g., for performance attributes with more matches and less certainty). According to the received performance attributes 570, stage parameter configuration 452 may provide updates 572 for one, some, or all attributes (or none if the performance attributes do not affect the current parameter values). Updates 572 may be provided to model trainer 454 which may configure, build, or rebuild both stages of a pipeline (e.g., stages 520, 530, 540, and 550) and the machine learning model (e.g., similarity model 560) to update a pipeline according to parameter updates and training 574, in various embodiments.

Matching pipeline 510 may receive data 502 for evaluation, process the data through the stages of matching pipeline 510 and output the identity of similar items 504. Similar items output 504 may be used, in some embodiments, to train similarity model 560. For example, model trainer 454 may perform training using supplied training sets or labels, or may issue training prompts, as discussed more below with regard to FIGS. 6A and 9. Training responses 582 may be received and used in accordance with a training technique to update similarity model 506. In some embodiments, model trainer 454 can provide pipeline quality metrics, as illustrated below with regard to FIG. 6C.

Figure 6A:
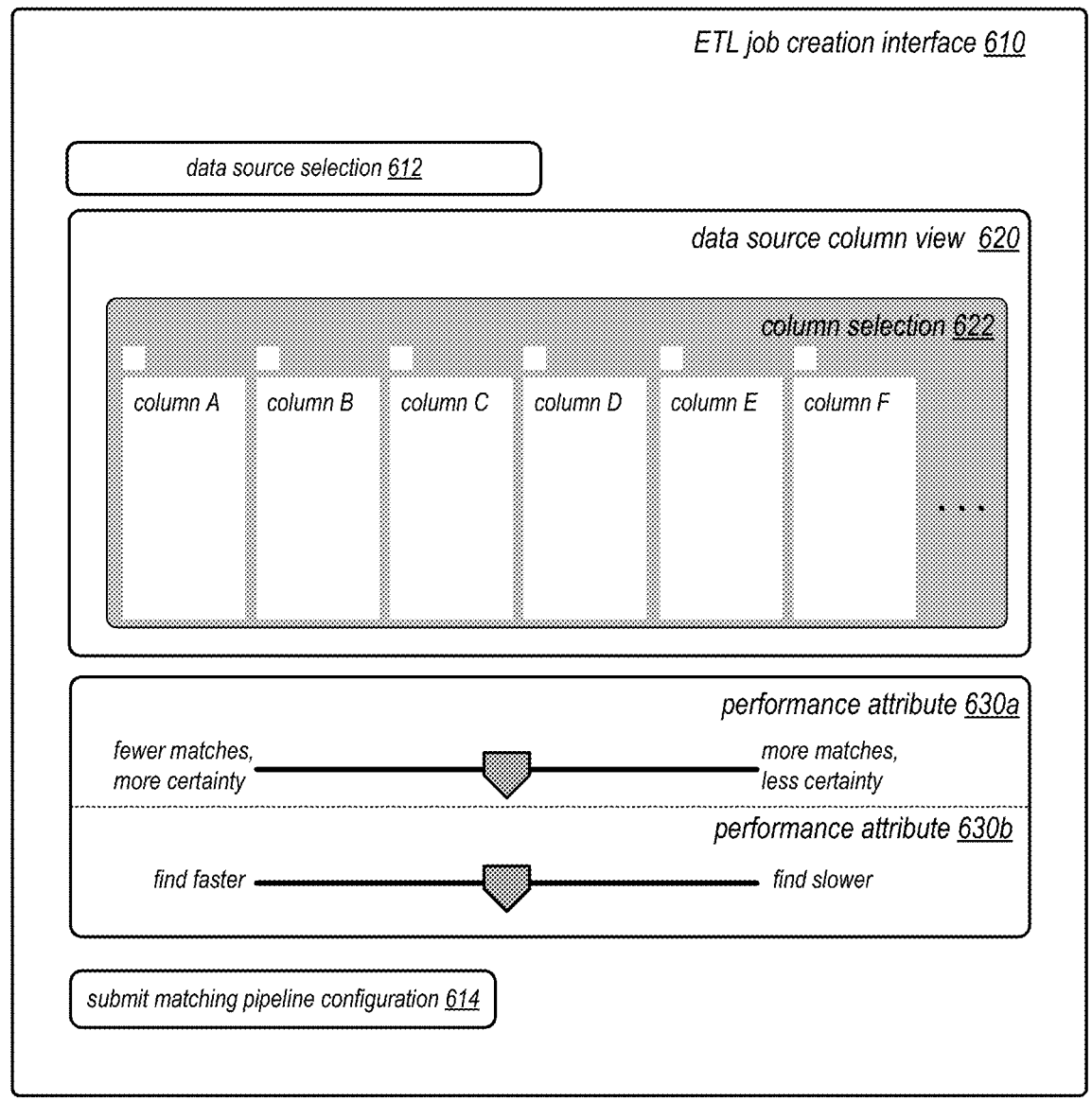
FIGS. 6A-6D illustrate example graphical user interfaces for training a machine learning pipeline, according to some embodiments.

FIGS. 6A-6D are example graphical user interfaces (GUIs) for ETL job creation, according to some embodiments. In FIG. 6A, ETL job creation interface 610 may implement data source selection 612, which may be a user interface element to allow a user to select the data source to which the matching pipeline is to be trained and/or applied. Data source column view 620 may provide a user with elements 622 to select those columns to use for training and matching. In some embodiments, the columns may be automatically suggested or selected without user input (e.g., by applying a feature extraction technique based on initial labeled inputs.

Different performance attribute user interface elements, such as elements 630a and 630b may be implemented. For example, a slider element that can illustrate and specify relative performance values for more or fewer matches, more or less certain results, and faster or slower performance. Other performance attributes or other types of performance attribute input elements may be used and therefore the previous examples are not intended to be limiting. A user interface element 614 to submit the matching pipeline configuration may be included.

Figure 6B:
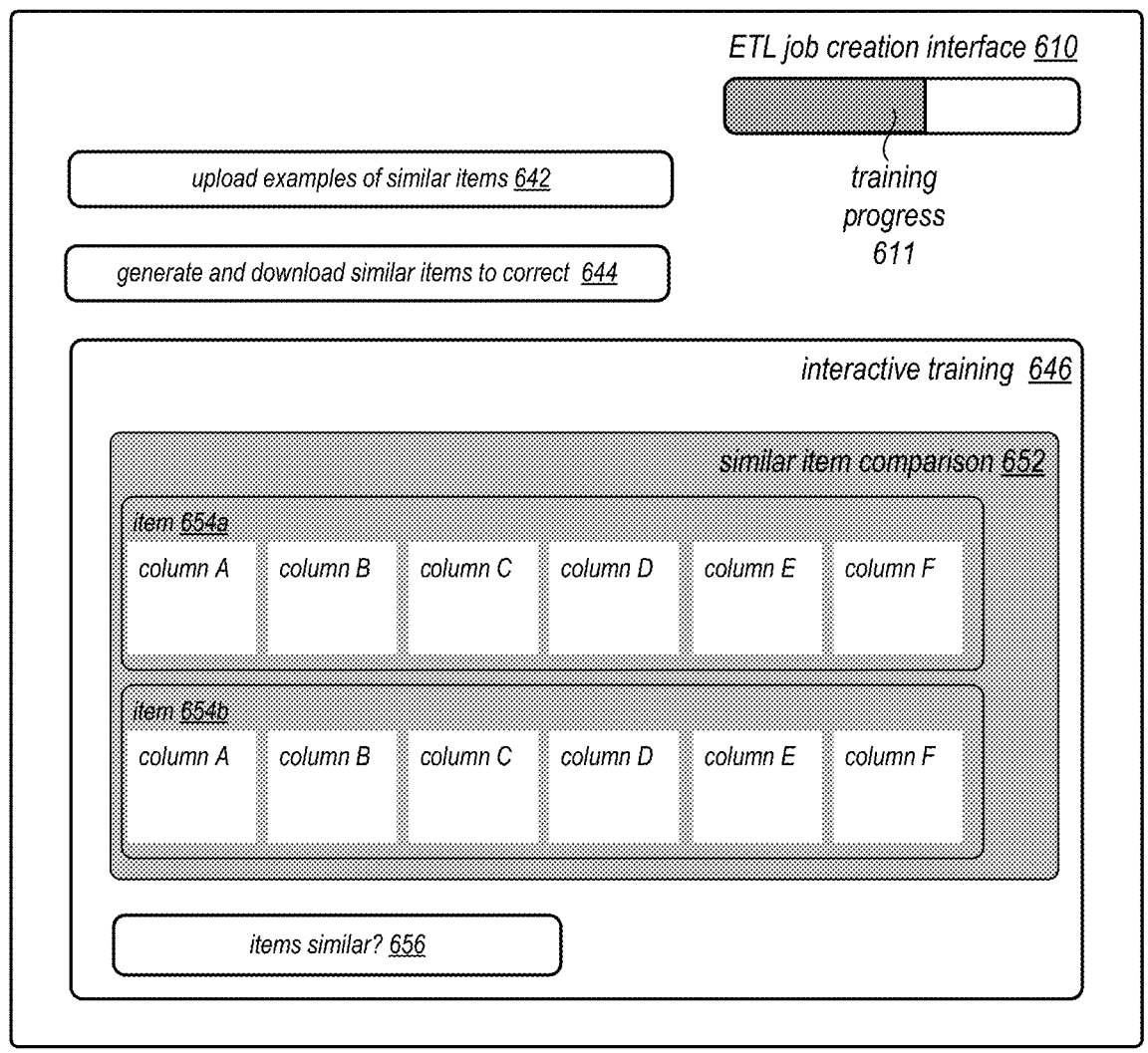

In FIG. 6B, ETL job creation interface 610 may implement various possible model training features. For example, upload element 642 may allow a user to upload a file with labeled training results to train the model and pipeline. Generate and download element 644 may cause ML trainer 454 to generate a training set of unlabeled items, which the user can label and upload using element 644. ETL job creation interface 610 may also implement interactive training 646, which display a series of similar item comparisons 652, which a user may label as similar or not via element 656. Although only one such comparison is illustrated, multiple comparison prompts 652 may be provided to train the model.

ETL job creation interface 610 may include a progress indicator 611 for training progress, in some embodiments. The progress indicator may provide a visual cue as to how much longer training of the model may take.

Figure 6C:
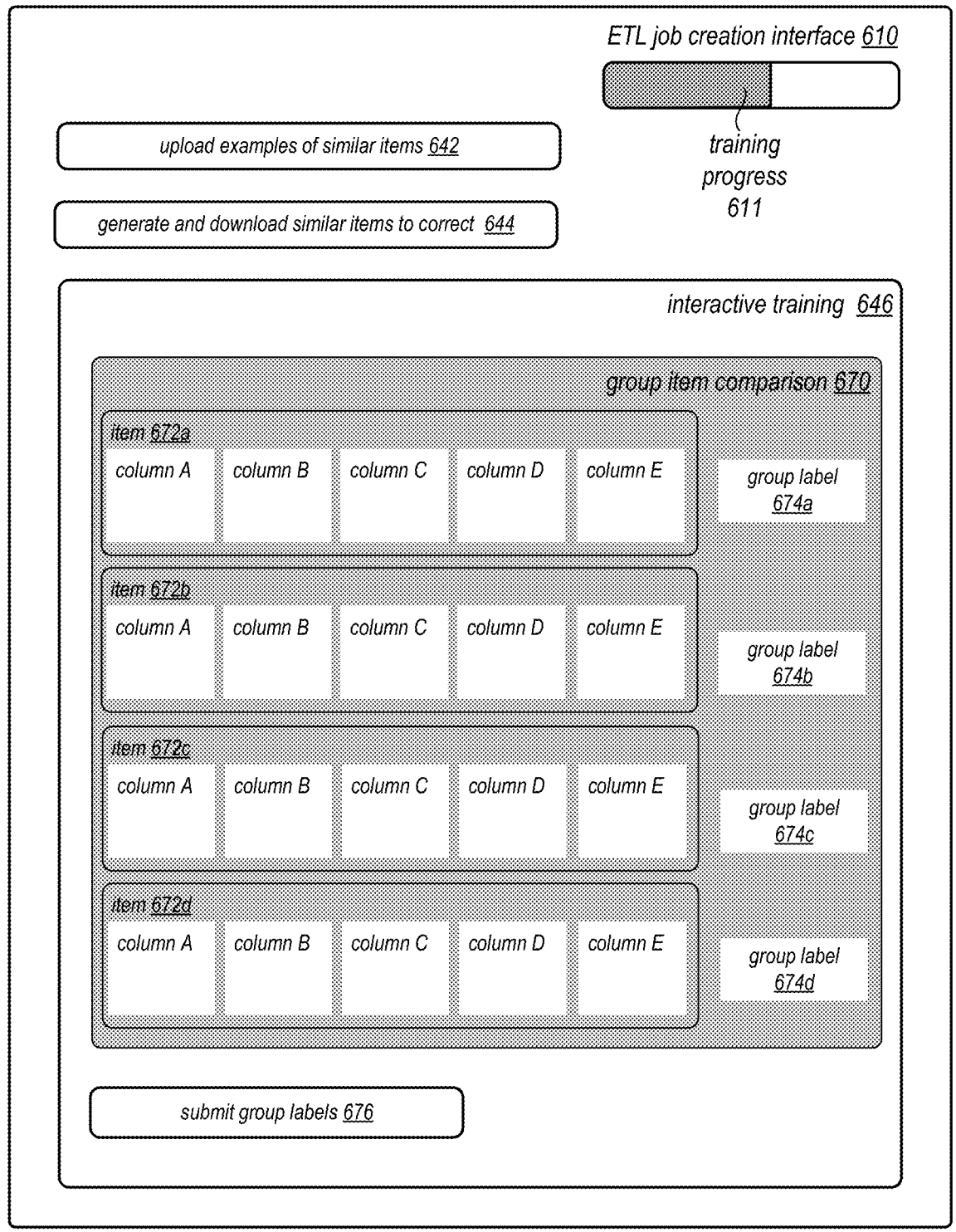
Figure 9:
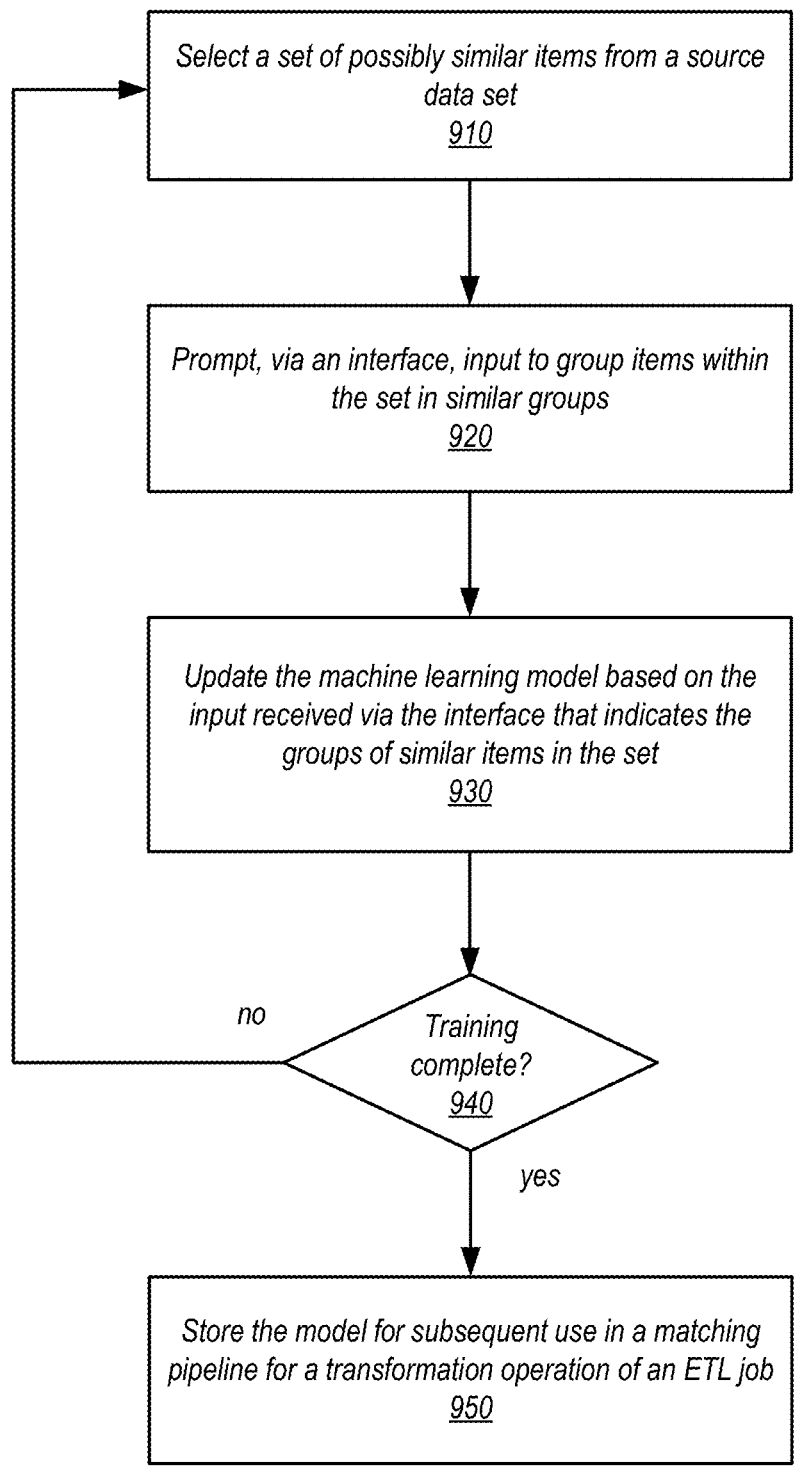
FIG. 9 is a high-level flowchart illustrating various methods and techniques to implement active training for a machine learning model applied in a machine learning pipeline for an ETL job, according to some embodiments.

In FIG. 6C, ETL job creation interface 610 may implement a group item comparison element, as discussed below with regard to FIG. 9. Items, such as items 672a, 672b, 672c, and 672d may be displayed. Group label user interface inputs 674a, 674b, 674c, and 674d may accept a group label so that similar items are given the same group label. Element 676 may submit the group labels for the displayed items.

Figure 6D:
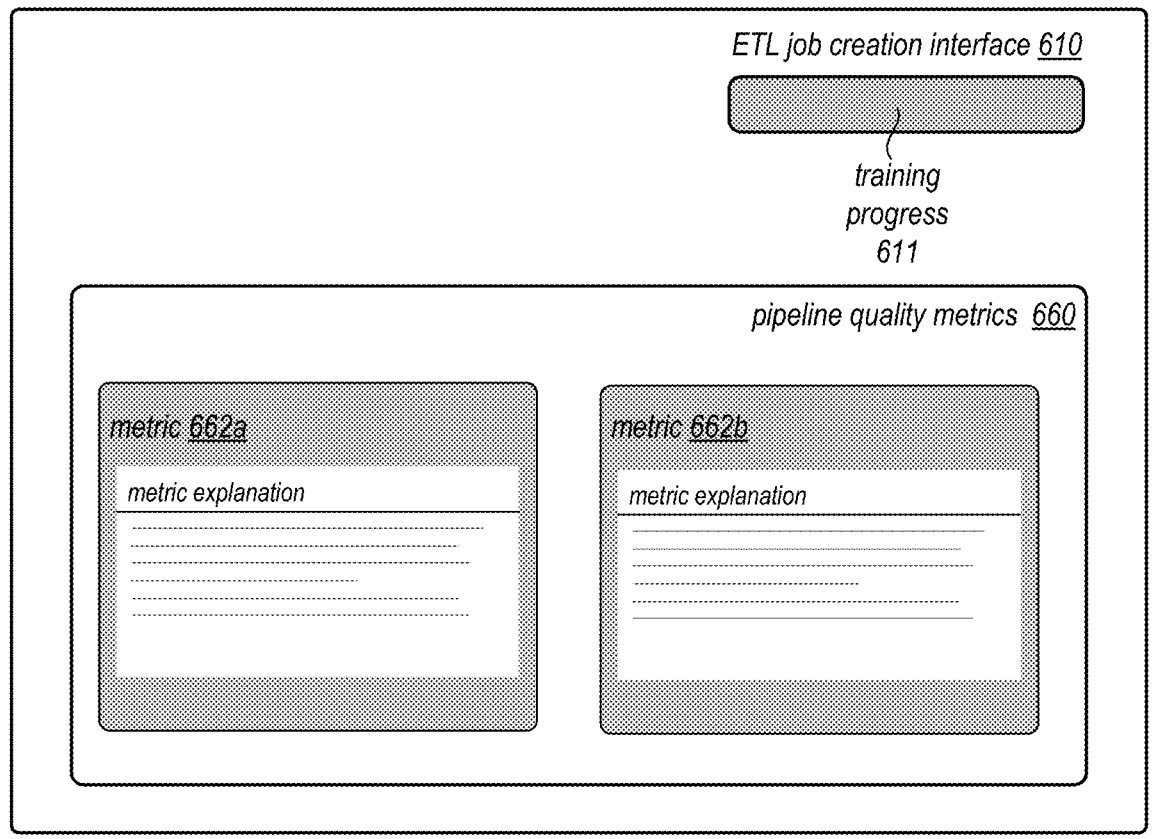

In FIG. 6D, ETL job creation interface 610 illustrates an example of pipeline quality metrics 660. Pipeline quality metrics 660 may be displayed, which may identify various metrics, such as metrics 662a and 662b, and respective explanations. For example, metrics such as pipeline precision, recall, area under precision recall curve (AUPRC), or accuracy score (e.g., max F1) may be explained including the impact of performance attributes upon the quality metrics 660 in some embodiments.

Figure 7:
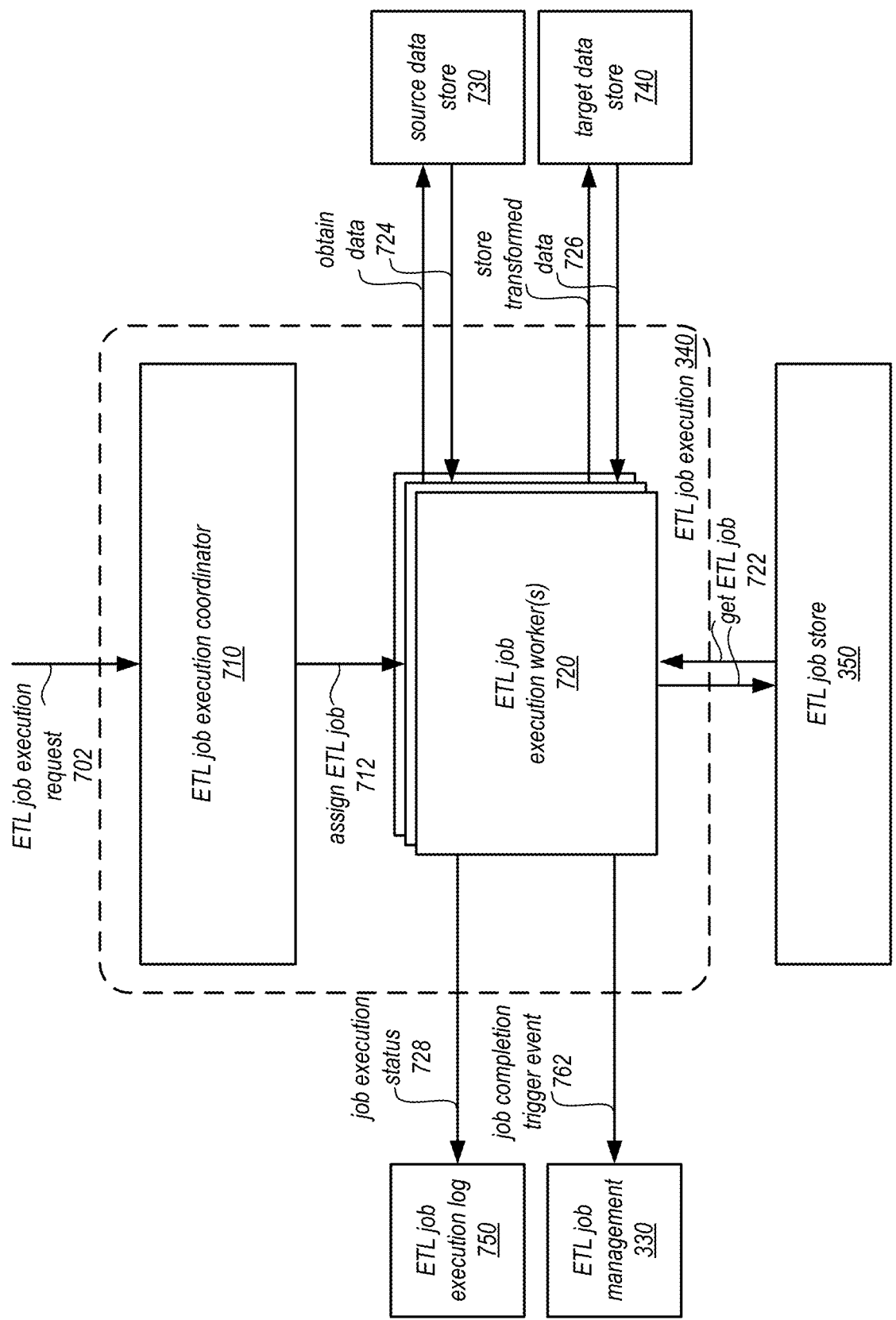
FIG. 7 is a logical block diagram illustrating interactions to perform an ETL job at an ETL service, according to some embodiments.

FIG. 7 is a logical block diagram illustrating interactions to execute an ETL job, according to some embodiments. ETL job execution 340 may implement an ETL job execution coordinator 710 that assigns ETL jobs 712 to one or more ETL job execution workers(s) 720 which may access source data store 730 and target data store 740 to obtain data 724, apply transformations, including machine learning pipelines and corresponding models, and store transformed data 726. ETL job execution request 702 may identify the job to execute (e.g., by include a job name or other identifier). ETL job execution coordinator 710 may determine the resources needed to execute the ETL job and assign the ETL job to one or more ETL job execution worker(s) 720.

ETL Job execution worker(s) 720 may get information 722 (including executable code, invoked operations or transformations, and other information (e.g., machine learning models, configuration parameters) to execute the identified ETL job) from ETL job store 350 for the ETL job. ETL job execution worker(s) 720 may then perform the ETL job in parallel or serialized fashion, obtaining data 724 from the source data store 730 (which may be a data storage service 210 of provider network 200). For example, ETL job execution worker(s) 720 may establish a connection to transfer data from source data store 730 and send one or more requests to obtain some or all of a source data object (e.g., via API requests for the source data store or via storage or transfer protocol, like secure file transfer protocol (SFTP) or an internet Small Computer Systems Interface (iSCSI)). Job execution worker(s) 720 may then apply the various transformation(s) or other operations specified by the ETL job to the obtained data.

Various transformations may be applied by ETL job execution worker(s) 720 and may include, but are not limited to, dropping one or more fields, values, or items from the source data object, converting data into a relational data format (e.g., converting lists, items or attributes, into row entries with respective column values), renaming a column, field, or attribute, selecting particular fields from the data object, or splitting fields into two different frames, locations, fields, or attributes, splitting rows, entries, or items into separate rows, entries, or items, unboxing or boxing data values, like strings, aggregating or combining data values, reducing the fidelity of data values by converting, rounding, truncating or modifying data values, or recognizing and generating custom data values (e.g., that combine values of multiple different types).

ETL job execution worker(s) 720 may establish a connection to store transformed data 726 into target data store 740 (which may be the same or different as source data store 730) via API requests for target data store 740 or via storage or a transfer protocol, like SFTP or iSCSI. ETL job execution worker(s) 720 may also access and update an ETL job execution log 750 with job execution status 728. For example, ETL job execution workers may identify the progress of the ETL job (e.g., X rows out of Y total rows in a source table processed). In this way, failures of ETL job execution worker(s) 720 may be recovered from by access ETL job execution log 750 to determine the last processed portion of a source data object. Errors and other events may be recorded for the ETL job in ETL job execution log 750, in some embodiments. ETL job execution worker(s) 720 may send trigger events 762 indicating completion of the ETL job to ETL job management 330, in some embodiments, which may be a trigger event or execution criteria for other ETL jobs.

Although FIGS. 2-7 have been described and illustrated in the context of an ETL service, the various techniques and components illustrated and described in FIGS. 2-7 may be easily applied to other data access or management systems in different embodiments that may facilitate ETL processing operations. Stand-alone ETL processing systems are an example of another embodiment that may be implemented in private networks or systems to perform similar techniques to those described above. As such, FIGS. 2-7 are not intended to be limiting as to other embodiments of a system that may implement event driven ETL processing.

Figure 8:
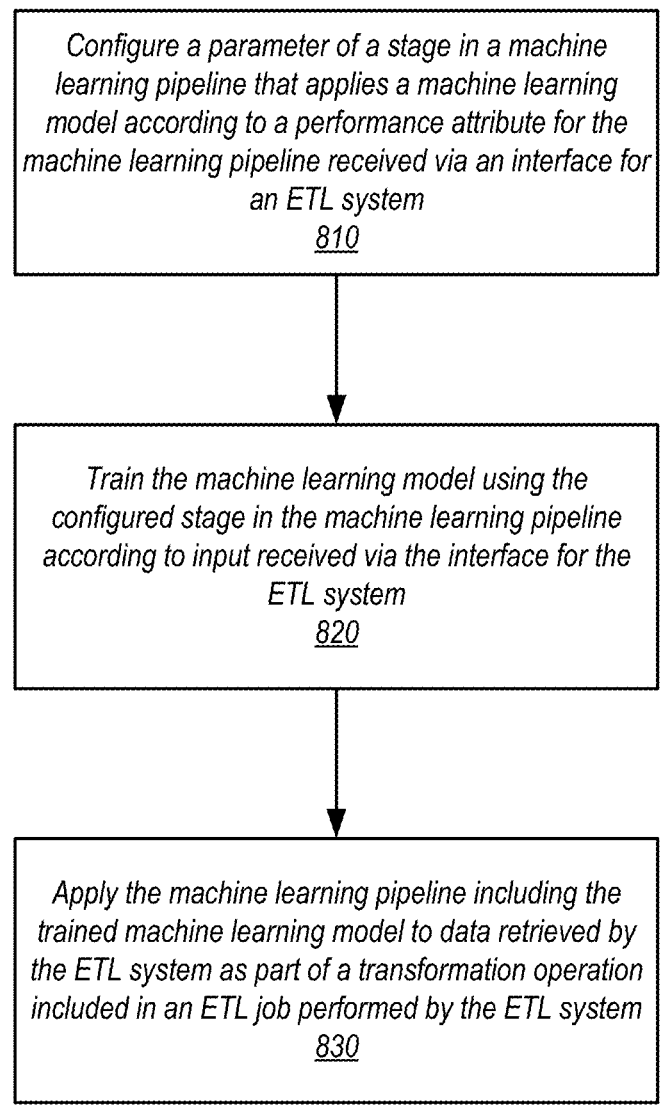
FIG. 8 is a high-level flowchart illustrating various methods and techniques to implement using specified performance attributes to configure machine learning pipeline stages for an ETL job, according to some embodiments.

FIG. 8 is a high-level flowchart illustrating various methods and techniques to implement using specified performance attributes to configure machine learning pipeline stages for an ETL job, according to some embodiments. Various different systems and devices may implement the various methods and techniques described below, either singly or working together. For example, an ETL service such as described above with regard to FIGS. 2-7 may be configured to implement the various methods.

Alternatively, a combination of different systems and devices, such as a storage subsystem that manages access to data stored in directly attached storage devices may transform data using ETL processing the below techniques. Therefore, the above examples and or any other systems or devices referenced as performing the illustrated method, are not intended to be limiting as to other different components, modules, systems, or configurations of systems and devices.

As indicated at 810, a parameter of a stage in a machine learning pipeline that applies a machine learning model is configured according to a performance attribute for the matching pipeline received via an interface for an ETL system, in some embodiments. For example, the performance attributes may describe result attributes (e.g., more results or less results), accuracy tolerance (e.g., more accurate or less accurate), speed, resource consumption, cost, or any other attribute of performing matching analysis via the machine learning pipeline. The parameter change may be made at one (or more stages). For example, if a performance attribute is for faster performance, then some parameter values, such as a blocking stage parameter value may be lowered in order to decrease the number of possible similar items evaluated, increasing speed of the evaluation. Parameter updates may be used to rebuild the machine learning pipeline data so that when the machine learning pipeline is invoked, the updated parameters may be incorporated (e.g., for training or ETL job).

As indicated at 820, the machine learning model may be trained using the configured stage in the machine learning pipeline according to input received via the interface for the ETL system, in some embodiments. For example, prompts for input, as discussed below with regard to FIG. 9, may be provided to a user, or a labeled set of training data may be received via the interface, in some embodiments, in order to receive indications of similar items. A training algorithm for the model may be applied based on results of the machine learning pipeline that utilizes the configured stage (e.g., the configured blocking or clustering stages). Training may be performed in response to a request to create a new machine learning pipeline or in response to an update to be made to a previously trained machine learning pipeline.

As indicated at 830, the machine learning pipeline may be applied including the trained machine learning model to data retrieved by the ETL system as part of a transformation operation included in an ETL job performed by the ETL system, in some embodiments. For example, a user may request to include the matching pipeline when creating an ETL job via the ETL system interface.

Active learning techniques may be implemented in some embodiments. FIG. 9 is a high-level flowchart illustrating various methods and techniques to implement active training for a machine learning model applied in a machine learning pipeline for an ETL job, according to some embodiments. As indicated at 910, a set of possibly similar items may be selected from a source data set, in some embodiments. In this way, set-wise comparison of items (as opposed to pairwise comparison of items may be performed For example, items may be selected for inclusion in a set in accordance with a cardinality constraint in order to limit the difference between items included in the set. In some embodiments, multiple sets of items for set-wise comparisons may be identified when analyzing a data source to prevent interference of other clients that may wish to access the data source (although in the illustrated flowchart only a single set is considered for evaluation at a given time).

As indicated at 920, input to group items within the set in similar groups may be prompted, in some embodiments. For example, group labels may be provided (e.g., A, B, C, D, etc.) and each item in the set that is similar can be labeled with the same group label. As indicated at 930, the machine learning model may be updated based on based on the input received via the interface that indicates the groups of similar items in the set, in some embodiments. In this way, the quality of the updates to the model can be increased given the larger set of information and the labeling effort for a user can be reduced as a group of labels may be considered at one time.

Training completion may be determined using matching quality metrics, as discussed above. If, for instance, one or more of the quality metrics is above a threshold value, then training may be complete. In another example, a time or resource limit for training may be imposed which may end training when exceeded. If training is not complete, select another set of possibly similar items, as indicated by the arrow back to element 910. If training is complete, as indicated by the positive exit from 940, store the model for subsequent use in a matching pipeline for a transformation operation of an ETL job, as indicated at 950, in some embodiments.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 10:
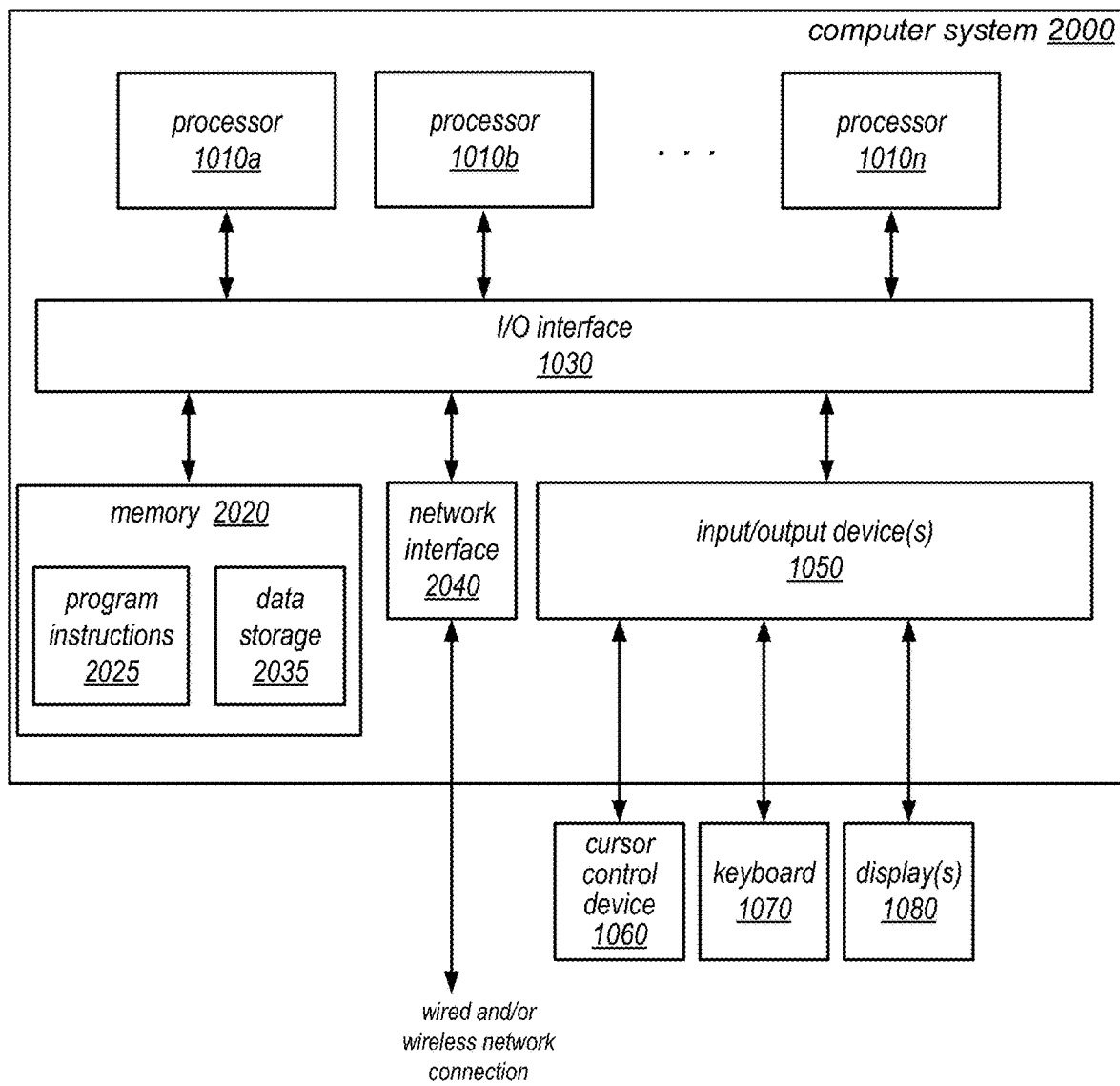
FIG. 10 illustrates an example system configured to implement the various methods, techniques, and systems described herein, according to some embodiments.

Embodiments of using specified performance attributes to configure machine learning pipeline stages for an ETL job as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within an ETL system may present ETL services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising: a plurality of computing devices, respectively comprising a processor and a memory, that are configured to implement an Extract Transform Load service, wherein the Extract Transform Load service is configured to: receive, via an interface for the Extract Transform Load service offered by a provider network, one or more ETL job creation requests to create an ETL job, wherein the one or more requests include a selection of a machine learning pipeline with a trained machine learning model to perform a transformation operation in addition to one or more other operations to include in the ETL job, wherein the one or more requests configure one or more parameters of the machine learning pipeline; configure the one or more parameters of a stage in the machine learning pipeline that applies the machine learning model according to the one or more requests; and execute the ETL job including the transformation operation performed by the machine learning pipeline and the one or more other operations in the ETL job.

2. The system of claim 1, wherein the transformation operation is a record linking operation according to a similarity determined between two or more items by the machine learning model.

3. The system of claim 1, wherein the transformation operation is a data scrubbing operation.

4. The system of claim 1, wherein the interface of the ETL service displays a graph of the ETL job.

5. The system of claim 1, wherein one of the one or more parameters specifies a threshold for including an item in a cluster of similar items determined using the machine learning model.

6. The system of claim 1, wherein the Extract Transform Load service is further configured to display, via the interface one or more trained machine learning models, including the trained machine learning model responsive to a search request received via the interface.

7. The system of claim 1, wherein the Extract Transform Load service is implemented as part of a provider network, wherein ETL job obtains data stored in another service of the provider network and stores a result of the ETL job in the other service of the provider network or a different service of the provider network.

8. A method, comprising: receiving, via an interface for an Extract Transform Load service offered by a provider network, one or more ETL job creation requests to create an ETL job, wherein the one or more requests include a selection of a machine learning pipeline with a trained machine learning model to perform a transformation operation in addition to one or more other operations to include in the ETL job, wherein the one or more requests configure one or more parameters of the machine learning pipeline; configuring, by the ETL service, the one or more parameters of a stage in the machine learning pipeline that applies the machine learning model according to the one or more requests; and executing, by the ETL service, the ETL job including the transformation operation performed by the machine learning pipeline and the one or more other operations in the ETL job.

9. The method of claim 8, wherein the transformation operation is a record linking operation according to a similarity determined between two or more items by the machine learning model.

10. The method of claim 8, wherein the transformation operation is a data scrubbing operation.

11. The method of claim 8, wherein the interface of the ETL service displays a graph of the ETL job.

12. The method of claim 8, wherein one of the one or more parameters specifies a threshold for including an item in a cluster of similar items determined using the machine learning model.

13. The method of claim 8, further comprising displaying, via the interface, one or more trained machine learning models, including the trained machine learning model responsive to a search request received via the interface.

14. The method of claim 8, wherein the Extract Transform Load service is implemented as part of a provider network, wherein ETL job obtains data stored in another service of the provider network and stores a result of the ETL job in the other service of the provider network or a different service of the provider network.

15. One or more non-transitory computer-readable storage media storing program instructions that, when executed on or across one or more computing devices, cause the one or more computing devices to implement: receiving, via an interface for an Extract Transform Load service offered by a provider network, one or more ETL job creation requests to create an ETL job, wherein the one or more requests include a selection of a machine learning pipeline with a trained machine learning model to perform a transformation operation in addition to one or more other operations to include in the ETL job, wherein the one or more requests configure one or more parameters of the machine learning pipeline;

configuring, by the ETL service, the one or more parameters of a stage in the machine learning pipeline that applies the machine learning model according to the one or more requests; and executing, by the ETL service, the ETL job including the transformation operation performed by the machine learning pipeline and the one or more other operations in the ETL job.

16. The one or more non-transitory computer-readable storage media of claim 15, wherein the transformation operation is a record linking operation according to a similarity determined between two or more items by the machine learning model.

17. The one or more non-transitory computer-readable storage media of claim 15, wherein the transformation operation is a data scrubbing operation.

18. The one or more non-transitory computer-readable storage media of claim 15, wherein the interface of the ETL service displays a graph of the ETL job.

19. The one or more non-transitory computer-readable storage media of claim 15, wherein one of the one or more parameters specifies a threshold for including an item in a cluster of similar items determined using the machine learning model.

20. The one or more non-transitory computer-readable storage media of claim 15, storing further program instructions that when executed by the one or more computing devices cause the one or more computing devices to further implement displaying, via the interface, one or more trained machine learning models, including the trained machine learning model responsive to a search request received via the interface.

* * * * *